R. M. HEAMES.
THREAD ROLLING DIE.
APPLICATION FILED JUNE 28, 1920.
1,414,641. Patented May 2, 1922.
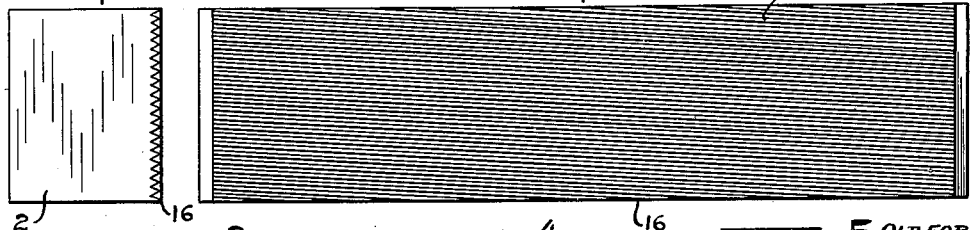
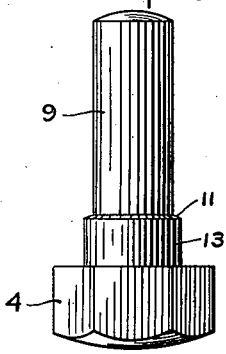
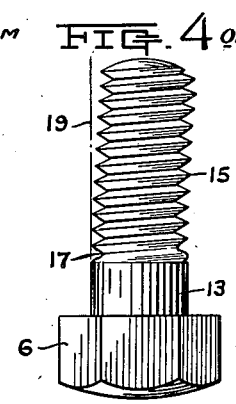
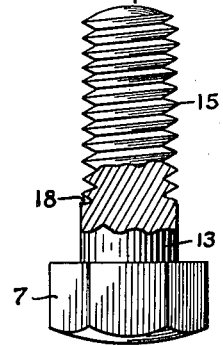
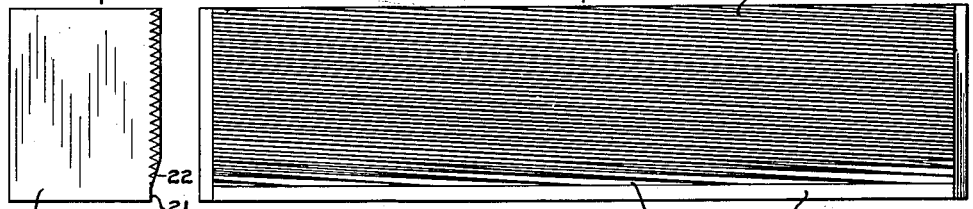
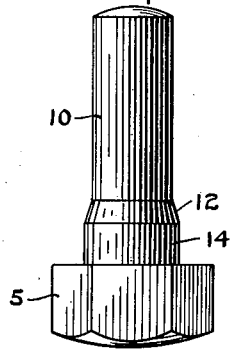
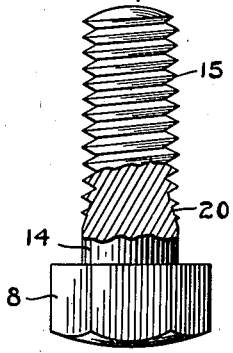
INVENTOR—
R. M. Heames
BY W. H. Lieber
ATTORNEY.

UNITED STATES PATENT OFFICE.

RICHARD M. HEAMES, OF DETROIT, MICHIGAN, ASSIGNOR TO THE VIXSON COMPANY, OF DETROIT, MICHIGAN, A CORPORATION OF MICHIGAN.

THREAD-ROLLING DIE.

1,414,641. Specification of Letters Patent. Patented May 2, 1922.

Application filed June 28, 1920. Serial No. 392,397.

*To all whom it may concern:*

Be it known that I, RICHARD M. HEAMES, a citizen of the United States, residing at Detroit, in the county of Wayne and State of Michigan, have invented certain new and useful Thread-Rolling Dies, of which the following is a specification.

This invention relates in general to improvements in the art of manufacturing screw threaded articles, and relates specifically to improvements in the construction of screw threaded articles such as cap screws and to an improved method of forming or producing such articles in quantity.

An object of the invention is to provide an improved construction of threaded articles such as cap screws. Another object of the invention is to provide durable and efficient apparatus for manufacturing threaded articles in quantity. Still another object of the invention is to provide a simple and efficient method for commercially producing threaded articles such as cap screws.

Several well known commercial methods are at present employed in the manufacture of cap screws in quantity. One of these comprises, forming individual blanks of definite shape, placing the blanks in succession between a pair of oppositely disposed elongated serrated dies, pressing the die serrations against a cylindrical portion of the intervening blank, and moving the dies longitudinally of their serrations in opposite directions, thereby rotating the blanks about their own axes and rolling screw threads upon them. The blanks now employed are provided with shanks having cylindrical portions of different diameters, connected by an abrupt shoulder at or near the place where it is desired to have the screw thread terminate. The cylindrical shank portion of largest diameter is located adjacent to the cap screw head, and has a diameter equal to the outside diameter of the final screw thread. The cylindrical shank portion of smallest diameter is located remote from the cap screw head at the place where the screw thread is to be formed, and has a diameter equal to the final outside diameter of the screw thread less a distance equal to the height of one thread.

While this method has produced relatively satisfactory results, it has been found that due to the abruptness of the shoulder connecting the larger and smaller shank portions of the blanks, the trailing ends of the thread forming serrations of the dies are frequently and readily broken with the result that many of the final cap screws are mutilated and defective. Besides producing imperfect final cap screws, this breakage of the dies necessitates frequent removal of the dies for repairs, thereby causing considerable delay in the operation of the operating machines with a resulting decrease in production.

The present invention contemplates the provision of a method of positively eliminating breakage of the dies with a consequent increase in the production and elimination of mutilated final product. The cap screws produced by the improved method are all perfect in construction and possess increased strength over those produced with the ordinary method and apparatus. The cost of production is also reduced to a minimum with the aid of the present invention, due to the formation of the threading dies so as to greatly increase their life.

A clear conception of the several steps constituting the improved method, and of the construction of threaded articles manufactured in accordance therewith, may be had by referring to the drawing accompanying and forming a part of this specification, in which like reference characters designate the same or similar parts in the various views.

Fig. 1 is a plan view of a threading die of ordinary construction, looking toward the serrations which are adapted to form screw threads upon a blank by rolling.

Fig. 2 is an end view of the ordinary threading die disclosed in Fig. 1.

Fig. 3 is an enlarged side view of an ordinary cap screw blank, drawn to a scale approximately double that employed in Figs. 1 and 2.

Fig. 4 is a side view drawn to the same scale as that of Fig. 3, of a defective cap screw produced by the ordinary method from a blank such as shown in Fig. 3.

Fig. 5 is a part sectional side view drawn to the same scale as that of Figs. 3 and 4, of a defective cap screw produced by the ordinary method from a blank such as shown in Fig. 3.

Fig. 6 is a plan view of a threading die of improved construction, looking toward the serrations which are adapted to form screw threads upon a blank by rolling.

Fig. 7 is an end view of the improved threading die disclosed in Fig. 6.

Fig. 8 is an enlarged side view of an improved cap screw blank, drawn to a scale approximately double that employed in Figs. 6 and 7.

Fig. 9 is a part sectional side view drawn to the same scale as that of Fig. 8, of a perfect cap screw produced by the new method from a blank such as shown in Fig. 8.

While the present invention has, for the sake of clearness, been specifically referred to herein as applicable to the production of cap screws, it is obvious that the principles involved are more generally applicable and that other threaded articles such as studs, bolts and set screws may also be produced thereby.

In Figs. 1 and 2 of the drawing, is shown a thread forming die of ordinary construction such as now generally employed in the production of rolled thread cap screws. The die 2 comprises a substantially rectangular block of steel having one side serrated to form parallel inclined ridges extending longitudinally of the die. The trailing ends 16 of the serrations are perpendicular to the plane of the serrations, and the ends of the block are preferably slightly inclined in order to facilitate clamping the die into the operating machine.

The cap screw blank 4 of ordinary construction shown in Fig. 3, comprises a hexagonal head, a cylindrical shank portion 13 of relatively large diameter directly adjacent to the head, a cylindrical shank portion 9 of smaller diameter remote from the head, and an abrupt shoulder 11 connecting the cylindrical shank portions 9, 13. The diameter of the cylindrical shank portion 13 is approximately equal to that of the outside diameter of the final screw thread. The diameter of the cylindrical shank portion 9 is approximately equal to that of the final outside thread diameter less the height of one thread.

The defective finished cap screw 6 shown in Fig. 4 comprises a hexagonal head, a cylindrical shank portion 13 directly adjacent to the head, and a screw threaded portion 15 remote from the head and adjacent to the shank portion 13. The screw threaded portion 15 is bent relatively to the shank portion 13 as indicated by the dot and dash line 19. The bending of the screw threaded portion 15 has been caused by the formation of the end 17 of the screw thread with the use of an ordinary threading die such as shown in Figs. 1 and 2.

The defective finished cap screw 7 shown in Fig. 5 comprises a hexagonal head, a cylindrical portion 13 directly adjacent to the head, and a screw threaded portion 15 remote from the head and adjacent to the cylindrical portion 13. This cap screw is defective at the termination 18 of the screw thread. The defect consists of the formation of an abrupt shoulder at the thread terminal by the serrations of an ordinary die such as shown in Figs. 1 and 2.

In Figs. 6 and 7 of the drawing, is shown a thread forming die of improved construction as contemplated by the present invention. The die 3 comprises a substantially rectangular block of steel having one side serrated to form parallel inclined ridges extending longitudinally of the die. The trailing ends 22 of the serrations are chamfered at an angle of approximately twenty degrees relatively to the plane of the serrated side of the die 3. The surface 21 adjacent to the chamfer is substantially parallel to the plane of the serrated side of the die, and the ends of the block are preferably slightly inclined in order to facilitate clamping the die into the operating machine.

The cap screw blank 5 of improved construction shown in Fig. 8, comprises a hexagonal head, a cylindrical shank portion 14 of relatively large diameter directly adjacent to the head, a cylindrical shank portion 10 of smaller diameter remote from the head, and a gradually tapered shank portion 12 connecting the cylindrical shank portions 10, 14. The diameter of the cylindrical shank portion 14 is approximately equal to that of the outside diameter of the final screw thread. The diameter of the cylindrical shank portion 10 is approximately equal to that of the final thread diameter less the height of one thread. The generatrices of the tapered portion 12 form an angle of approximately twenty degrees with the common axis of the cylindrical portions 10, 14, the tapered portion 12 being of a length at least equal to twice the width of a thread 15.

The perfect finished cap screw 8 shown in Fig. 9 is one produced by the improved method and comprises a hexagonal head, a cylindrical shank portion 14 directly adjacent to the head, and a screw threaded portion 15 remote from the head and adjoining the cylindrical portion 14. The end 20 of the screw thread terminates along the tapered shank portion, and gradually disappears in the metal of the cap screw shank.

In commercial practice, the threads are rolled upon the blanks 4, 5 in the following manner:—

With the ordinary method, a pair of threading dies 2 are placed in an operating machine, one of the dies ordinarily being fixed and the other being reciprocable. With the dies 2 properly positioned, the serrated portion of one die faces that of the other, these portions being properly spaced apart and being slightly inclined relatively to each other so that a thread of proper depth is gradually impressed into the intervening blank. The blanks 4 are then fed singly and in succession between the dies 2 so that the blank shanks 9 extend across the dies at right angles. With a blank 4 thus positioned, one of the dies is advanced longitudinally, thereby rolling the blank over the other die and causing the die serrations to gradually embed themselves in the shank 9 and to roll a screw thread 15 thereon having an outside diameter equal to that of the shank portion 13. When the trailing end 16 of the die serration which forms the end portion of the thread 15, reaches the shoulder 11 of a blank 4, the cap screw is completed and is removed from between the dies 2. The dies 2 are then restored to starting position and succeeding blanks 4 are sent through the same cycle of operations. Due to the abrupt formation of the shoulders 11 on the blanks 4, and also due to the abrupt ending of the die serrations, many defective cap screws 6, 7 are produced by this method, and the trailing ends 16 are often chipped or broken. In the defective cap screw 6, the final die serration which has been driven into the shank of the blank 4 adjacent to the shoulder 11, has acted as a wedge at the thread end 17 and has bent the shank of the cap screw as indicated by the dot and dash line 19. In the defective cap screw 7, the trailing end 16 of the final die serration has produced an abrupt terminal or wall 18 for the thread adjacent to the shoulder 11. This defect while avoiding bending of the cap screw, leaves an imperfect finished cap screw and is often more pronounced than as shown in Fig. 5. In some cases, the cap screw is decidedly bulged at the thread terminal and in all cases, the cap screws produced by the ordinary method are weakest at the thread terminal.

With the improved method, a pair of threading dies 3 are placed in an operating machine wherein one die is fixed and the other is reciprocable. With the dies 3 properly positioned, the serrated portion of one die faces that of the other, these portions being properly spaced apart and being slightly inclined relatively to each other so that a thread of proper depth is gradually impressed into the intervening blank 5. The blanks 5 are then fed singly and in succession between the dies 3 so that the blank shanks 10 extend across the dies at right angles. With a blank 5 thus positioned, one of the dies 3 is advanced longitudinally, thereby rolling the blank over the other die and causing the die serrations to gradually embed themselves in the shank 10 and to roll a screw thread 15 thereon having an outside diameter equal to that of the shank portion 14. When the trailing end 22 of the serration which forms the end portion of the thread 15, reaches the tapered portion 12, the cap screw 8 is completed and is removed from between the dies 3. The dies 3 are then returned to starting position and succeeding blanks 5 are passed through the same cycle of operations. Due to the gradual taper of the blank portions 12, and to the chamfer of the trailing ends 22 of the dies 3, the thread ends gradually disappear in the portion 20 of the cap screws 8 and cap screws of maximum strength are produced. Every cap screw 8 produced by this method is a duplicate of every other one and no defective screws result. The plane portions 21 coact with the adjacent cylindrical portions 14 of the blanks 5 thereby preventing bending of the screw shanks and gauging the thread depths. Due to the gradual termination of the threads 15, and the chamfer at the trailing ends 22 of the serrations, the dies 3 are not readily chipped or broken thereby avoiding delay in the operation of the threading machines due to the necessity of making repairs. The new method has demonstrated its superiority over the old and produces perfect finished cap screws.

It should be understood that it is not desired to limit the invention to the exact details of construction of the cap screw blank and dies and to the precise steps of the method herein shown and described, for obvious modifications within the scope of the appended claims may occur to persons skilled in the art.

It is claimed and desired to secure by Letters Patent:—

1. As an article of manufacture, a thread rolling die comprising an elongated block having longitudinal serrations the ends of which are chamfered at one of the longitudinal edges of said block.

2. As an article of manufacture, a thread rolling die comprising an elongated block having rectilineal longitudinal serrations terminating at a longitudinal edge of said block, the ends of said serrations being chamfered at said longitudinal block edge.

3. As an article of manufacture, a thread rolling die comprising an elongated block having parallel inclined substantially V-shaped longitudinal serrations the trailing ends of which terminate at a longitudinal edge of said block, the ends of said serrations being chamfered along said longitudinal block edge.

4. As an article of manufacture, a thread rolling die comprising a block having rectilineal longitudinal serrations the trailing ends of which are chamfered at one of the longitudinal edges of said block, and having a surface adjacent to said chamfer which lies in the plane of the bottoms of said serrations.

5. As an article of manufacture, a thread rolling die comprising a block having longitudinal serrations the trailing ends of which are chamfered.

6. As an article of manufacture, a thread rolling die comprising a block having longitudinal serrations the trailing ends of which are chamfered, said block having a plane surface parallel to the tops of said serrations and intersecting said chamfer.

7. As an article of manufacture, a thread rolling die comprising an elongated block having parallel inclined longitudinal serrations the trailing ends of which are chamfered, said block having a plane surface parallel to the tops of said serrations and intersecting said chamfer at the bottoms of said serrations.

8. As an article of manufacture, a thread rolling die comprising a block having rectilineal longitudinal serrations the trailing ends of which are chamfered, and having a surface adjacent to said chamfer which lies in a plane of the bottoms of said serrations.

9. As an article of manufacture, a thread rolling die comprising a rectangular block having parallel inclined rectilineal longitudinal serrations in one face thereof the trailing ends of which are chamfered at one of the longitudinal edges of the block, and having a surface adjacent to the chamfer which lies in the plane of the bottoms of said serrations.

In testimoy whereof, the signature of the inventor is affixed hereto.

RICHARD M. HEAMES.

Witness:
GEO. J. LIEBER.